United States Patent
Bordes et al.

(10) Patent No.: US 6,333,833 B1
(45) Date of Patent: *Dec. 25, 2001

(54) HARD DISK PLATTER ASSEMBLY WITH PLASTIC HUB FOR USE IN A REMOVABLE CARTRIDGE

(75) Inventors: Jacques Bordes; Marc Frouin, both of Avranches (FR)

(73) Assignee: Nomai S.A. (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/274,807

(22) Filed: Jul. 14, 1994

(51) Int. Cl.⁷ ................................................. G11B 23/03
(52) U.S. Cl. ......................................................... 360/133
(58) Field of Search ............................. 360/133; 369/291

(56) References Cited

U.S. PATENT DOCUMENTS 3,917,068 * 11/1975 Cheney ................................. 360/133
4,847,826 * 7/1989 Sakaguchi et al. .................. 369/291
4,904,364 * 2/1990 Davis et al. ...................... 204/224 R
4,928,032 * 5/1990 Skoch et al. ...................... 313/318.04
5,122,078 * 6/1992 Davis et al. .......................... 439/405
5,179,607 * 1/1993 Sellers et al. .
5,243,481 * 9/1993 Dunckley et al. ................. 360/99.08
5,805,379 * 9/1998 Bordes .............................. 360/99.12

FOREIGN PATENT DOCUMENTS

125879 * 4/1992 (JP) ...................................... 360/132

* cited by examiner

Primary Examiner—George J. Letscher
(74) Attorney, Agent, or Firm—Blakely, Sokoloff, Taylor & Zafman

(57) ABSTRACT

A hard disk assembly comprises a hub made of injection molded liquid crystal plastic, to which is mounted a magnetic disk by a twist-lock screw top. The expensive step of machining the critical hub component is avoided because sufficient accuracies can be achieved with the liquid crystal plastic when injection molded.

12 Claims, 4 Drawing Sheets

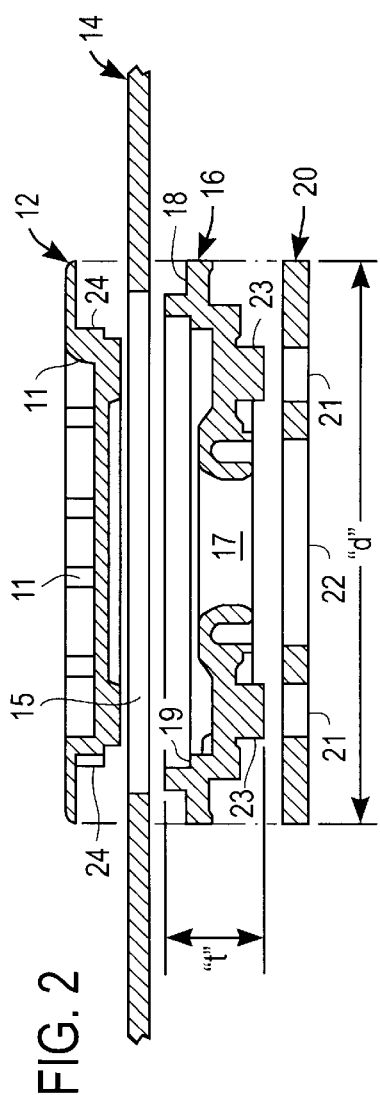
FIG. 2
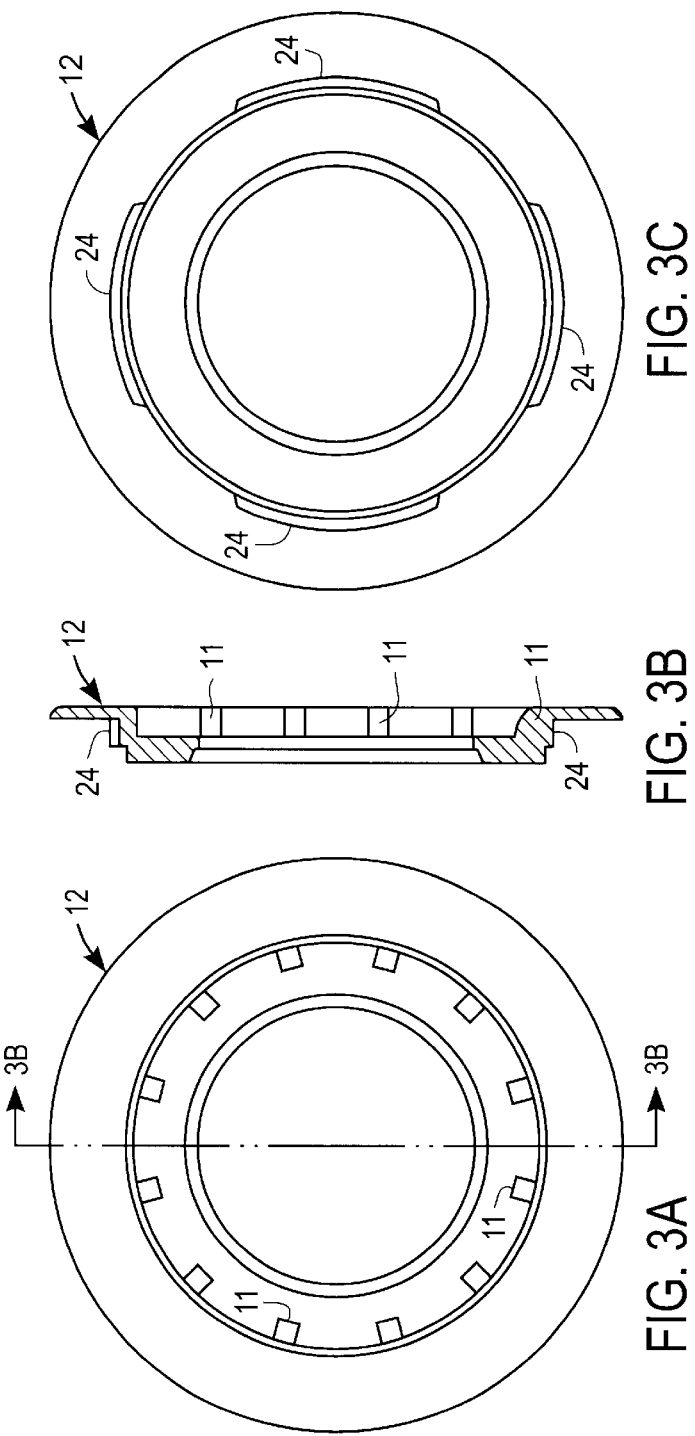
FIG. 3A
FIG. 3B
FIG. 3C

HARD DISK PLATTER ASSEMBLY WITH PLASTIC HUB FOR USE IN A REMOVABLE CARTRIDGE

BACKGROUND OF THE INVENTION

1. Field of the Invention

The invention relates generally to computer memory and more specifically to removable hard disk cartridges and disk drives.

2. Description of the Prior Art

The popularity of personal computers is, in part, fueled by the ever decreasing costs of such systems. The component manufacturers which supply parts to the personal computer manufacturers are under increasing pressure to reduce their costs to keep up with the ever shrinking profit margins. The hard disk memory, such as fixed disk and removable disk, in a personal computer system represents a major cost included in such systems.

The manufacturers of hard disk drives have therefore been exploring ways to reduce their costs. A principal part of the cost of fabricating a hard disk drive, and/or removable cartridge, is the machining and assembly costs involved. When unit costs were much higher, the machining of various critical parts for hard disk memories seemed insignificant. Now, machining of metal parts represents a significant cost in disk drive and cartridge manufacturing.

Less expensive components and manufacturing methods are therefor critical to competitors in the personal computer and hard disk drive industries.

SUMMARY OF THE PRESENT INVENTION

It is therefore an object of the present invention to provide a hard disk cartridge that is inexpensive to manufacture.

It is an object of the present invention to provide hard disk cartridge that provides good performance.

Briefly, a hard disk assembly embodiment of the present invention comprises a hub made of injection molded liquid crystal plastic, to which is mounted a magnetic disk by a twist-lock screw top.

An advantage of the present invention is that a hard disk hub is provided that is inexpensive to manufacture.

Another advantage of the present invention is that a hard disk assembly is provided that is useful in a removable hard disk cartridge application.

A still further advantage of the present invention is that a cartridge disk is provided that permits automated manufacturing techniques to be used for mounting the disk to the hub.

Another advantage of the present invention is that a hard disk assembly is provided in which the expensive step of machining the critical hub component is avoided because acceptable finished component tolerances can be achieved with liquid crystal plastic when simply injection molded.

These and other objects and advantages of the present invention will no doubt become obvious to those of ordinary skill in the art after having read the following detailed description of the preferred embodiment which is illustrated in the drawing figures.

IN THE DRAWINGS

FIG. 2 is a cross-sectional view of the hard disk assembly of FIG. 1 taken along the line 2—2 through the axis of rotation of the hard disk assembly;

Figure 1:
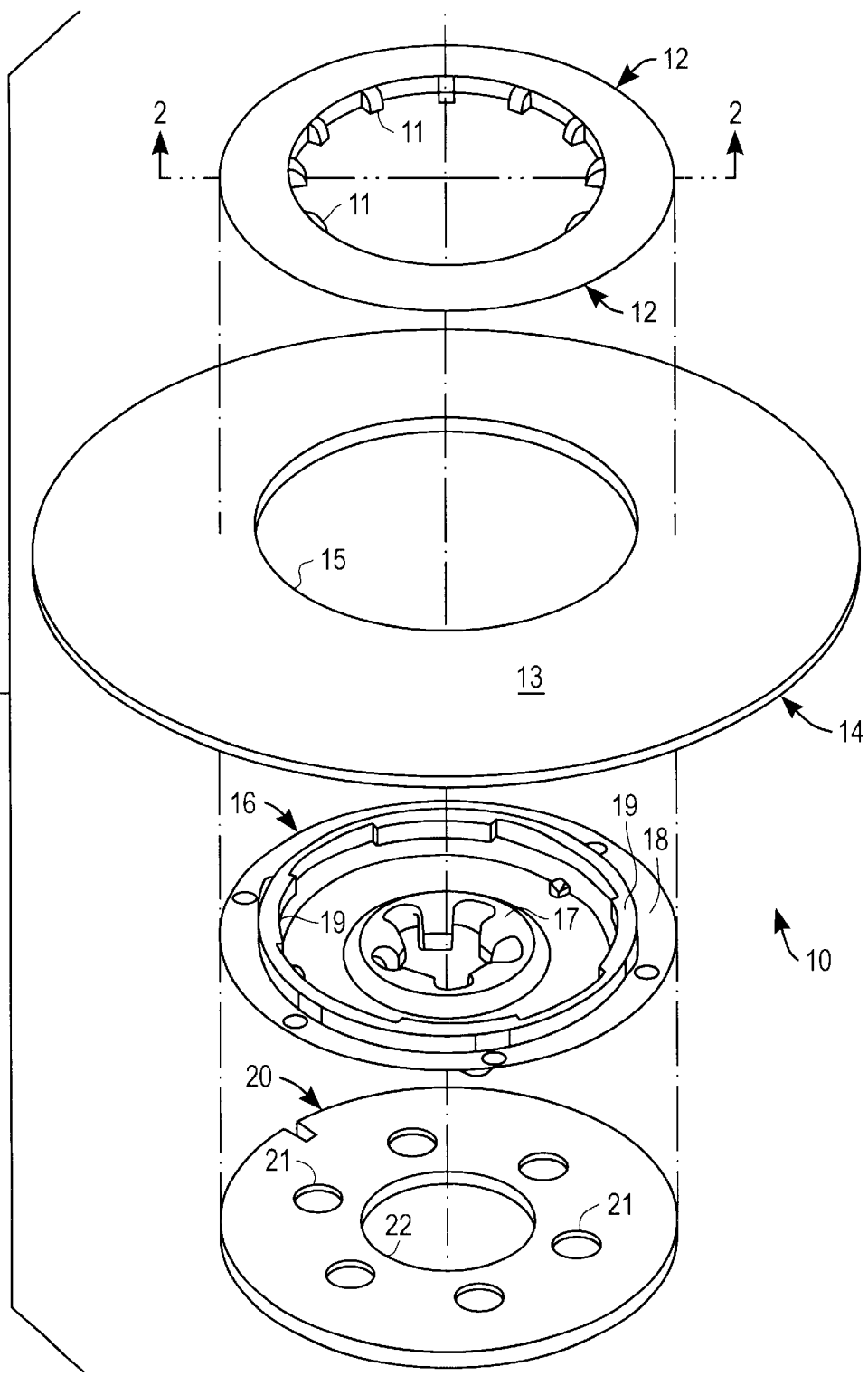
FIG. 1 is an exploded three-dimensional assembly diagram of a hard disk assembly embodiment of the present invention.
Figure 5:
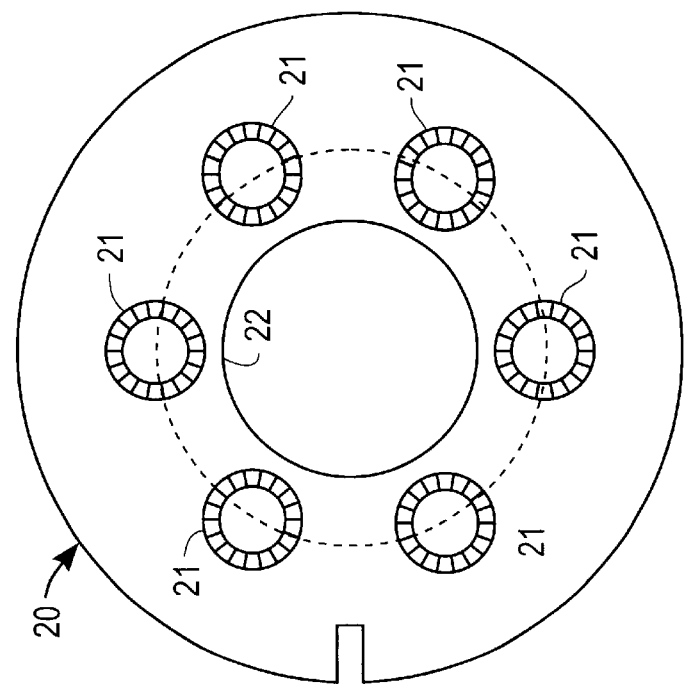
Figure 4B:
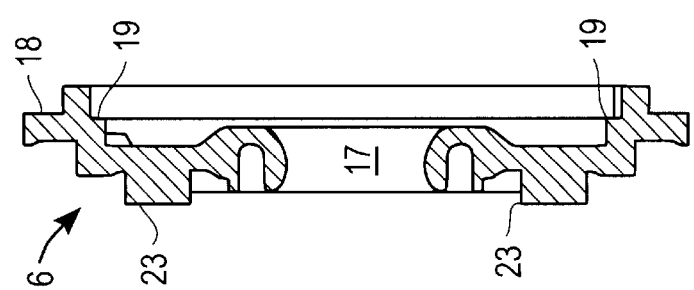
Figure 4A:
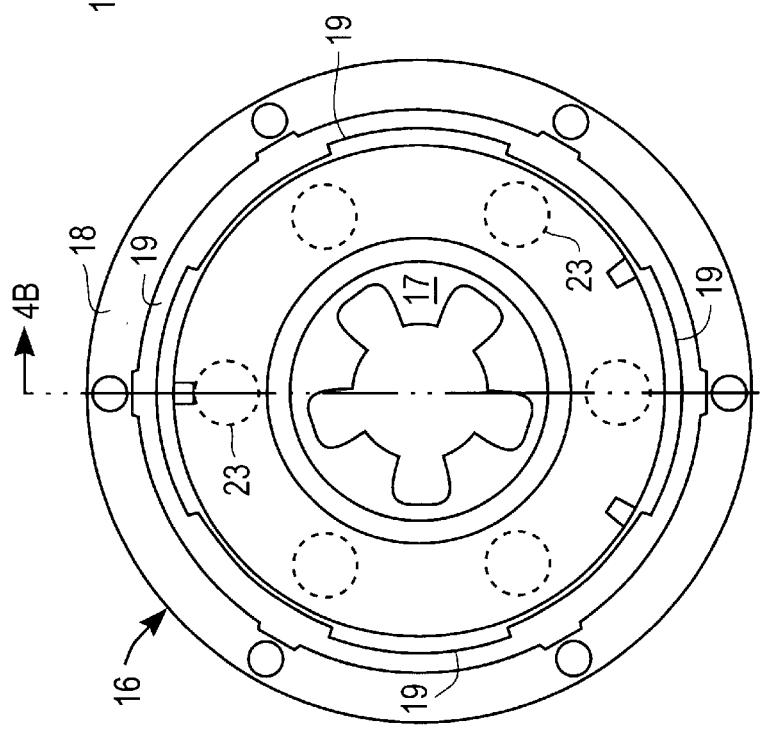
Figure 6:
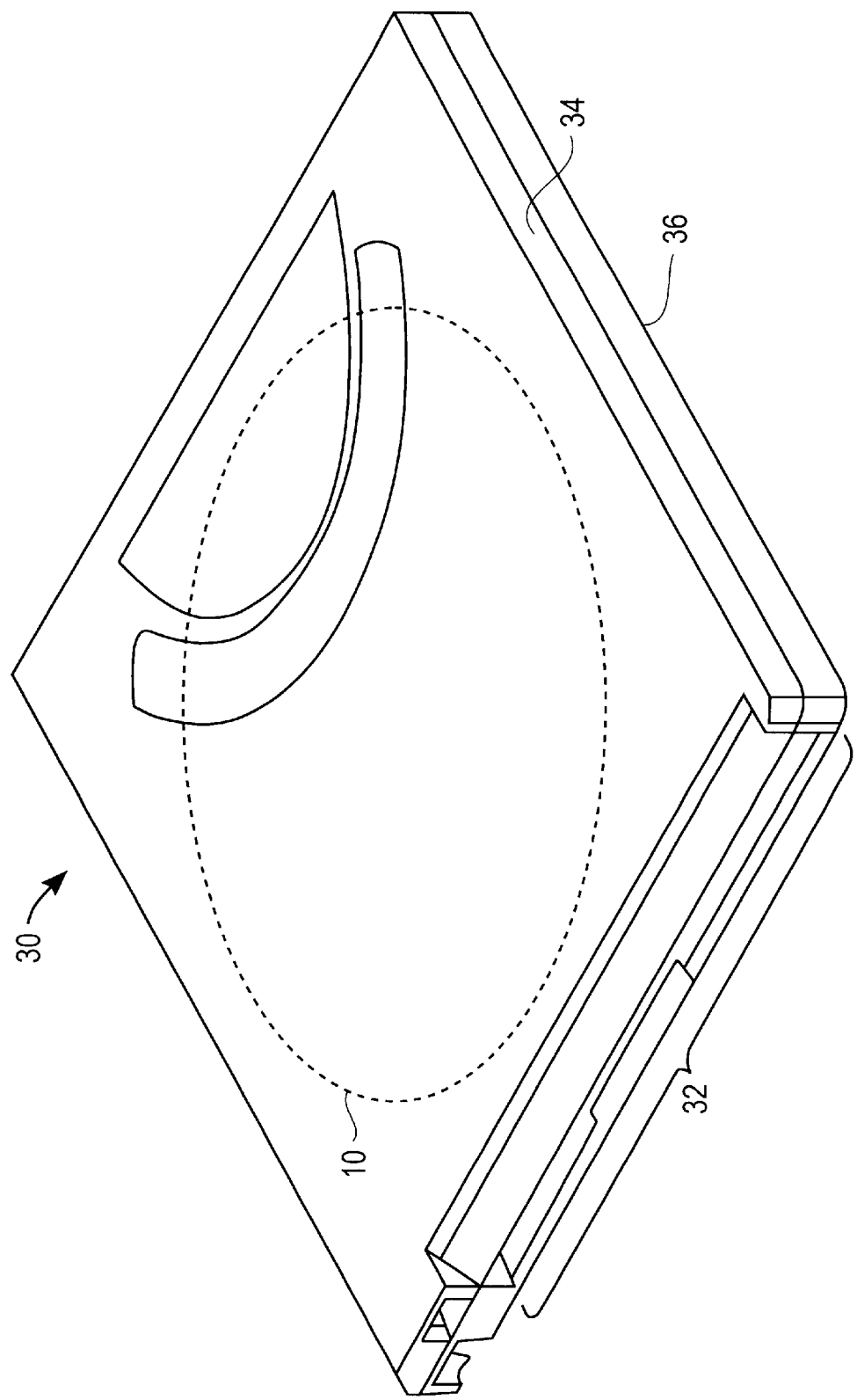

FIGS. 3A, 3B and 3C, respectively, are a top view, a cross-sectional view taken along the line 3B—3B of FIG. 3A and a bottom view of the screw top included in the hard disk assembly of FIG. 1;

FIGS. 4A and 4B, respectively, are a top view and a cross-sectional view taken along the line 4B—4B of FIG. 4B of the plastic hub included in the hard disk assembly of FIG. 1;

FIG. 5 is a top view of the magnetic plate included in the hard disk assembly of FIG. 1; and FIG. 6 is a perspective view of a hard disk cartridge that includes the hard disk assembly of FIG. 1.

DETAILED DESCRIPTION OF THE PREFERRED EMBODIMENT

FIG. 1 illustrates a hard disk assembly embodiment of the present invention, referred to herein by the general reference numeral 10. The hard disk assembly 10 comprises a plurality of guide teeth 11 on a screw top 12, at least one recording surface 13 on a magnetic disk 14 with a center opening 15, a plastic hub 16 with a drive gear 17, a lip 18 and a set of locking teeth 19, and a magnetic plate 20 with a plurality of sprocket holes 21 and a drive opening 22. The screw top 12 and the hub 16 each comprise a liquid crystal plastic, e.g., such as is sold commercially under the trademark VECTRA A130, by Hoechst Chemicals (Germany). The recording surface 13 comprises a magnetic coating, such as ferrite oxide, for the recording of data with a magnetic read/write head in a disk drive that mates with the hard disk assembly 10.

The fit of the magnetic disk 14 and especially the center opening 15 to the plastic hub 16 and its lip 18 must be precise so that wobble and runout when the disk 14 is rotated are controlled. Conventional metal hubs include a machining step in their fabrication. The plastic hub 16 is preferably injection-molded of liquid crystal plastic to five to ten micrometer accuracy using otherwise conventional fabrication techniques. With liquid crystal plastic material and a readily-attained five to ten micrometer molding accuracy, no subsequent machining is required to give good results.

FIG. 2 shows the screw top 12 and magnetic plate 20 in position for assembly to the plastic hub 16 with the disk 14 in between. In a typical implementation, the plastic hub 16 has a outside diameter "d" of approximately forty-five millimeters and a thickness "t" of 5.2 millimeters. The magnetic plate 20 allows a disk drive that receives the hard disk assembly 10 when mounted in a removable cartridge to seize and hold the hard disk assembly to a spindle and motor. The drive gear 17 is engaged to rotate the magnetic disk 14 during operation. The center opening 15 of the magnetic disk 14 fits around the plastic hub 16 tightly against the lip 18 and is locked down by the screw top 12 by action of a set of locking) teeth 24 that engage the matching set of locking teeth 19, e.g., with a quarter-turn of the top 12 to the hub 16.

The screw top is illustrated in FIGS. 3A, 3B and 3C. As shown in FIG. 3C, each locking tooth 24 on the screw top 12 may, for example, span an arc of 45°.

In FIGS. 4A and 4B, the hub 16 is illustrated as having a set of bosses 23. The locking teeth 19 each span an arc of 45° with a space in between to accept the locking teeth 24 on the screw top 12. During assembly, the locking teeth 24 are passed through the center opening 15 in the magnetic disk 14, and twist-interlocked with the locking teeth 19 on the plastic hub 16.

FIG. 5 shows the magnetic plate 20. The holes 21 are beveled to mate easily with the bosses 23. The holes 21, may, for example, be distributed about the center axis at 60° increments at a circle diameter of approximately twenty-five millimeters. When inserted into the holes 21, the bosses 23 provide a positive mechanical rotational lock between the plate 20 and the hub 16.

FIG. 6 illustrates a removable hard disk cartridge 30 that contains the hard disk assembly 10 and keeps it clean and protects it from mechanical injury. A door 32 is used to open and give access to a set of read/write heads in a hard disk drive into which the cartridge 30 is inserted. A top case section 34 and a bottom case section 36, which when combined enclose the hard disk assembly 10, may be made of polycarbonate, as may the doors 32. The doors 32 include a two-piece door mechanism for parting open the doors along a line parallel to the plane of the magnetic disk 10.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A removable hard disk cartridge to insert into a matching disk drive, comprising:
   a magnetic plate to magnetically clamp to a disk drive spindle;
   a hub secured to the magnetic plate to rotate about a central axis thereof, comprising injection-molded liquid crystal plastic material and having molding accuracies in the range of five to ten micrometers;
   a magnetic disk mounted to the hub and having a magnetic coating to record data with a read/write head in a matching disk drive;
   a screw top mated to the hub with twist-locks to secure the magnetic disk to the hub with axial forces; and
   a shell having a cover piece and a base piece defining an enclosure around the hub, disk and screw top.

2. The cartridge of claim 1, wherein:
   the hub comprises locking teeth to assemble the hub to the magnetic disk.

3. The cartridge of claim 1, wherein:
   the screw top and hub each comprise matching locking teeth to secure the hub to the magnetic disk.

4. The cartridge of claim 1, wherein:
   the magnetic plate comprises a plurality of sprocket holes to positively lock the magnetic plate to the hub.

5. The cartridge of claim 4, wherein:
   the sprocket holes each include one flared-open beveled end.

6. The cartridge of claim 1, wherein:
   the hub includes a lip upon which the magnetic disk is secured to the hub.

7. The cartridge of claim 1, further comprising:
   a door assembly mounted to an open end of the shell enclosure to open during insertion into a matching disk drive.

8. The cartridge of claim 1, wherein:
   the magnetic plate comprises a set of six sprocket holes angularly spaced apart from one another by approximately 60° to positively lock the magnetic plate to the hub.

9. The cartridge of claim 1, wherein:
   the screw top and hub each comprise matching locking teeth spanning an arc of approximately 45° each to secure the hub to the magnetic disk.

10. A removable hard disk cartridge to insert into a matching disk drive, comprising:
    a magnetic plate to magnetically clamp to a disk drive spindle and having a plurality of sprocket holes, wherein said sprocket holes each include one flared-open beveled end;
    a hub secured to the magnetic plate to rotate about a central axis thereof, comprising injection-molded liquid crystal plastic material and having a molded-in lip and locking teeth and having molding accuracies in the range of five to ten micrometers;
    a magnetic disk mounted to the hub against said lip and having a magnetic coating to magnetically record data;
    a screw top with locking teeth matching said locking teeth of the hub to twist-lock secure the magnetic disk to the hub;
    a shell having a cover piece and a base piece defining an enclosure around the hub, disk and screw top; and
    a movably mounting door assembly relative to the shell enclosure.

11. The cartridge of claim 10, wherein:
    the magnetic plate comprises a set of sprocket holes to positively lock of the magnetic plate to the hub.

12. The cartridge of claim 10, wherein:
    the screw top and hub each comprise matching locking teeth spanning an arc of approximately 45° each to secure the hub to the magnetic disk.

* * * * *